Oct. 16, 1934.    A. E. JOHNSON    1,977,339
FOOD MASHER
Filed March 9, 1933

INVENTOR.
Adam E. Johnson.
BY
H. G. Manning
ATTORNEY

Patented Oct. 16, 1934

1,977,339

UNITED STATES PATENT OFFICE 1,977,339

FOOD MASHER

Adam E. Johnson, Naugatuck, Conn.

Application March 9, 1933, Serial No. 660,127

6 Claims. (Cl. 146—176)

This invention relates to culinary utensils, and more particularly to a combination food masher and receptacle for the food mashed thereby.

One object of this invention is to provide a perforated food hopper which is adapted for mashing or "ricing" various articles of food, such as potatoes, and also for pressing the juice from various fruits.

A further object is to provide a masher of the above nature in which the perforated food hopper is provided with a flange for resting upon the attached receptacle, whereby spattering and spraying of the juice forced through said container is avoided.

A further object is to provide a food masher of the above nature in which the food is pressed into the perforated hopper by a handle-operated plunger, said handle being pivotally and detachably secured to the receptacle thus permitting the latter to be used for other culinary purposes whenever desired.

A further object is to provide a combination food masher and receptacle of the above nature which will be simple in construction, inexpensive to manufacture, easy to manipulate, compact, ornamental in appearance, and efficient and durable in use.

With these and other objects in view there has been illustrated on the accompanying drawing, one form in which the invention may be conveniently embodied in practice.

Figure 1:
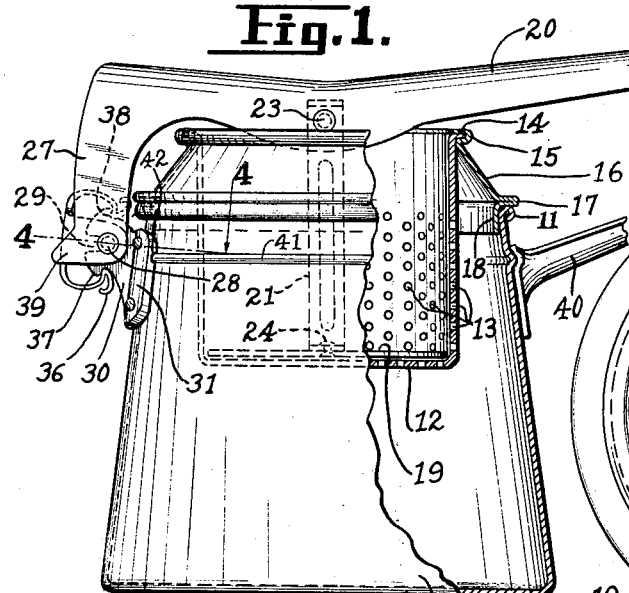
Fig. 1 represents a view in side elevation, and partly in vertical section, of the combination food masher and receptacle.
Figure 2:
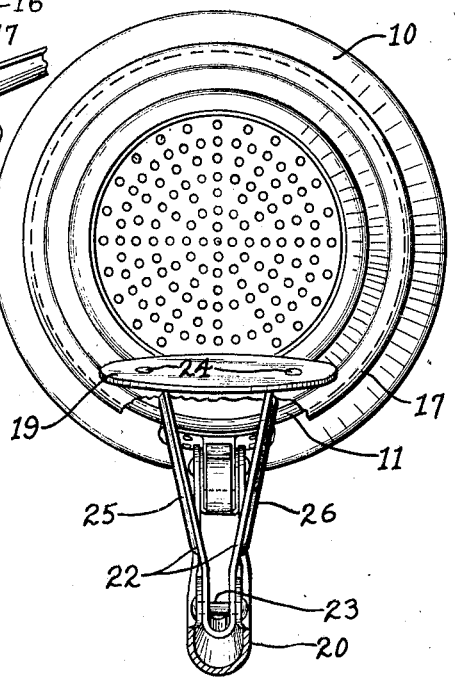
Fig. 2 is a plan view of the same with the plunger shown in raised position.

Referring now to the drawing in which like reference numerals denote corresponding parts throughout the several views, the numeral 10 indicates a receptacle or saucepan preferably having downwardly-diverging side walls and terminating at its upper edge in an outwardly rolled bead 11. Concentrically mounted within the upper part of the receptacle 10 is a cylindrical hopper 12 having its bottom and side walls provided with a series of perforations 13.

In order to support the perforated hopper 12 in the elevated position shown in Fig. 1, the upper edge of said hopper is flared outwardly to form an annular flange 14, which is surrounded by a bead 15 integrally formed at the upper edge of a tapered skirt 16 surrounding the upper part of said hopper 12. The lower and larger part of the skirt 16 is bent outwardly and inwardly to form a flat protruding annular rim 17, and below said rim 17 is a short integral depending neck 18. The rim 17 is adapted to rest upon the bead 11 of the receptacle 10, and the depending neck 18 of the skirt 16 serves to prevent the hopper 12 from slipping out of its central position within said saucepan 10.

Force for mashing the food or extracting juices therefrom is applied by a plunger disc 19 having a sliding fit in the hopper 12, and adapted to be manually reciprocated therein by means of a handle lever 20 having a detachable pivoted connection with the receptacle 10 as will be hereinafter more fully described. The plunger 19 is pivotally connected with the lever 20 by means of a V-shaped connecting bracket 21 consisting of a pair of converging legs 22 pivotally connected at their inner ends to said lever 20, as by a rivet 23, said lever 20 being U-shaped in cross-section. The outer ends of the legs 22 are rigidly fastened to the plunger disc 19, as by rivets 24, and said legs 22 are stiffened by means of longitudinal ribs 25 and 26. The rear end of the lever 20 is bifurcated to form a pair of substantially parallel lateral depending arms 27, to the lower ends of which is secured a transverse pin 28.

Figure 3:
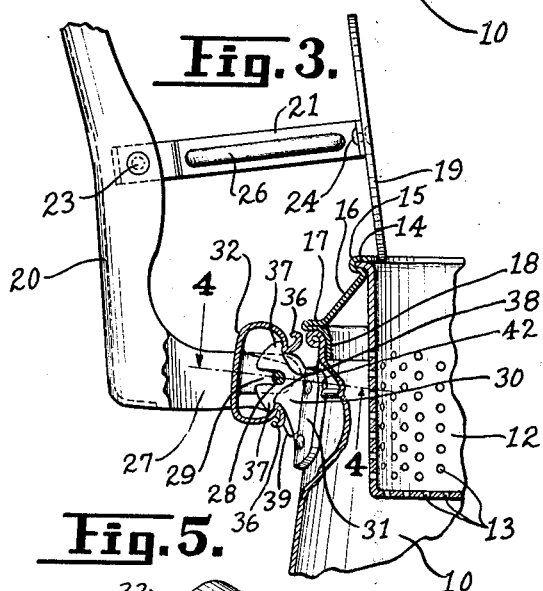
Fig. 3 is a fragmentary view showing the detachable hinged construction of the plunger handle and receptacle.
Figure 4:
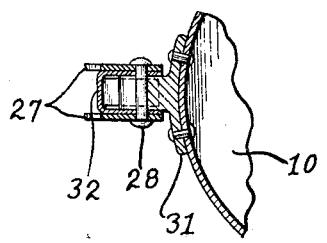
Fig. 4 is a fragmentary sectional view of the hinge construction, taken along the line 4—4 of Fig. 3.
Figure 5:
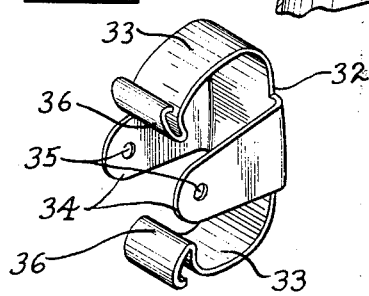
Fig. 5 is an enlarged perspective view of the spider spring employed in the hinge construction.

The pin 28 is adapted to have a loose fit within a horizontal U-shaped slot 29 formed in a substantially heavy T-shaped lug 30 having a curved base 31 affixed, as by rivets, to the upper part of the receptacle 10 (see Figs. 1 and 3). The pin 28 is detachably held within the base of the slot 29 by means of a resilient spider member 32 having a pair of curved upper and lower arms 33 and another pair of parallel side arms 34, as best shown in Fig. 5. The side arms 34 are provided with a pair of alined holes 35 adapted to fit said pin 28 inside of said handle-arms 27. In other words, the arms 34 are adapted to be straddled by the arms 27 of the lever 20. The extremities of the pin 28 are headed over upon the outer surfaces of said arms 27 so that said handle lever 20 and spider member 32 will be removable as a unit from said saucepan, whenever desired.

The resilient upper and lower arms 33 are integrally formed on their free ends with a pair of outwardly bent curved dogs 36 adapted to be spread apart by a pair of projections 37 formed on the lug 30, said dogs being positively held in locked position by a pair of hook recesses 38 located behind said projections 37.

The lever 20 is prevented from swinging back beyond the position shown in Fig. 3 by means of a pair of offset projections 39 formed at the extremities of the arms 27, the edges of said projections being adapted to strike against the surface of the bracket 31, as shown in dotted lines in Fig. 3. When the handle 20 is held in the above position, the plunger disc 19 will be allowed to rest upon the inner edge of the bead 15 so that access may be had to the hopper 12.

In case it is desired to remove the lever 20 and spider 32 as a unit from the receptacle 10, it will only be necessary to force the lever in a counterclockwise direction beyond the position shown in Fig. 3, whereby the leverage of the projections 39 engaging against the bracket 31 will unsnap the dogs 36 of the spider member 32 out from their respective hook recesses 38 and permit the pin 28 to be readily pulled out of the horizontal slot 29. The hopper 12 and its attached skirt 16 may then be lifted from the receptacle 10. If desired, a handle member 40 may be attached to the saucepan 10 at a point opposite from the lug 30 to serve as an additional means for lifting and manipulating said saucepan 10. Moreover, an annular rib 41 may be formed in the receptacle to engage a notch 42 in the bracket 31 to stiffen the construction.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In a food masher and juice extractor, a saucepan, a perforated hopper, an outwardly flared and downwardly extending skirt member attached to the upper end of said hopper said skirt member having means adjacent its lower end for engaging the top edge of said saucepan for supporting and sealing said hopper upon the top edge of said saucepan, a handle lever detachably and pivotally mounted upon said sauce-pan, and a plunger member pivoted to said lever and adapted to slide within said hopper.

2. In a food masher and juice extractor, a sauce-pan having a rolled bead at its upper edge, a perforated cup-shaped hopper, a downwardly flared skirt member secured to the top edge of said hopper, said skirt member having a horizontal annular rim and depending vertical neck formed at its lower end, said rim being adapted to rest upon the top edge of said saucepan, a plunger member slidable in said hopper, and a lever member pivoted on the outside of said saucepan and also pivoted to said plunger member for manually operating the latter.

3. In a food masher and juice extractor, a sauce-pan, a perforated hopper supported in the upper end of said sauce-pan, a mashing piston slidable in said hopper, a handle lever pivoted to said piston, a bracket mounted on the exterior of said saucepan and having a slot therein, a horizontal pin transversely mounted in the end of said lever, and U-shaped spring means attached to said lever and resiliently engaging said bracket for detachably retaining said pin in said slot.

4. In a food masher and juice extractor, a sauce-pan, a perforated hopper supported in the open end of said sauce-pan, a mashing piston slidable in said hopper, a lever pivoted to said piston, a pair of opposed handle members attached adjacent the upper end of said saucepan, one of said handle members having a horizontal slot and a pair of detents formed therein, said lever being bifurcated at its lower end and carrying a transverse pin to engage in said slot and a pair of resilient catch arms to fit into said detents, whereby said lever will be detachably held in pivotal position upon said receptacle.

5. In a food masher and juice extractor, a sauce-pan, a perforated hopper supported in the open end of said sauce-pan, a mashing piston slidable in said hopper, a lever pivoted to said piston, a pair of opposed handle members attached adjacent the upper end of said saucepan, one of said handle members having a horizontal slot and a pair of detents formed therein, said lever being bifurcated at its lower end and carrying a transverse pin to engage in said slot and a pair of resilient catch arms to fit into said detents, whereby said lever will be detachably held in pivotal position upon said receptacle, the bifurcated portion of said lever having outstanding lugs for engaging said receptacle to limit the swing of said lever.

6. In a food masher and juice extractor, a sauce-pan, a perforated cup-shaped hopper having a downwardly extending skirt member having its lower edge in alinement with the top edge of said saucepan, said skirt member being adapted to rest upon the top edge of said sauce-pan, a plunger member slidable in said hopper, and a lever member pivoted on the outside of said sauce-pan and also pivoted to said plunger member for manually operating the latter.

ADAM E. JOHNSON.